(12) United States Patent
Nomaguchi et al.

(10) Patent No.: US 9,169,829 B2
(45) Date of Patent: Oct. 27, 2015

(54) HYDRAULIC SYSTEM AND WIND TURBINE GENERATOR PROVIDED THEREWITH

(75) Inventors: Hiroyuki Nomaguchi, Nagasaki (JP); Atsushi Yuge, Nagasaki (JP); Toshikazu Hayashi, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1207 days.

(21) Appl. No.: 12/588,784

(22) Filed: Oct. 28, 2009

(65) Prior Publication Data
US 2010/0104439 A1 Apr. 29, 2010

(30) Foreign Application Priority Data

Oct. 29, 2008 (JP) ................................ 2008-278823

(51) Int. Cl.
*F03D 7/02* (2006.01)
*F03D 9/00* (2006.01)
*F03D 9/02* (2006.01)

(52) U.S. Cl.
CPC .. *F03D 7/02* (2013.01); *F03D 9/00* (2013.01); *F03D 9/02* (2013.01); *Y02E 10/723* (2013.01)

(58) Field of Classification Search
CPC .... F15B 11/0423; F15B 11/165; F15B 11/45; F15B 2211/633; F15B 2211/6343; F15B 2211/6306; F15B 2211/6309; F03D 7/02; F03D 9/00
USPC ................. 184/6.4, 6.12, 6.13; 415/111, 112; 416/170 R, 174; 417/2
See application file for complete search history.

(56) References Cited

U.S. PATENT DOCUMENTS 3,424,951 A * 1/1969 Barker ........................... 361/170
4,348,155 A * 9/1982 Barnes et al. ................... 416/46

(Continued)

FOREIGN PATENT DOCUMENTS

| JP | S54-145798 U | 10/1979 |
|---|---|---|
| JP | US61/023520 | 7/1986 |

(Continued)

OTHER PUBLICATIONS

Japan Patent Office, "Office Action for JP 2009-219874", Feb. 5, 2013.

(Continued)

*Primary Examiner* — Sean J Younger
(74) *Attorney, Agent, or Firm* — Manabu Kanesaka; Benjamin J. Hauptman; Kenneth M. Berner (57) ABSTRACT

There is provided a hydraulic pump startup control device in a hydraulic system, which avoids an overloaded state at startup to enable low-temperature, fast startup and maintaining of the temperature with low-cost means in order to improve low-temperature startability. A bypass path 19 is placed in parallel with a hydraulic main line from a hydraulic tank, and the downstream of the bypass path is made merged with the hydraulic main line. A bypass valve 3 that opens or closes the bypass path is provided in the bypass path, and a pressure sensor is provided in the inlet of a hydraulic unit in the hydraulic main line. Further, a control device 10 to which a pressure detection value in the hydraulic main line is input from the pressure sensor to open the bypass valve based on the pressure detection value upon startup of the hydraulic unit. The control device repeats on-off control to circulate oil in the bypass path while keeping the pump discharge pressure and the flow rate to open the bypass path at startup so that the actuation power of the hydraulic unit will become the maximum in order to rise the hydraulic temperature of the hydraulic main line.

11 Claims, 6 Drawing Sheets

(56) References Cited

U.S. PATENT DOCUMENTS

| | | | | |
|---|---|---|---|---|
| 4,352,634 | A | * | 10/1982 | Andrews .................. 416/154 |
| 4,523,431 | A | * | 6/1985 | Budzich .................... 60/431 |
| 4,693,332 | A | * | 9/1987 | Miyata et al. ............. 180/422 |
| 5,133,644 | A | * | 7/1992 | Barr et al. ................ 417/218 |
| 5,303,551 | A | * | 4/1994 | Lee ........................... 60/431 |
| 5,575,148 | A | * | 11/1996 | Hirata et al. ............... 60/445 |
| 6,480,106 | B1 | * | 11/2002 | Crombez et al. .......... 340/461 |
| 6,629,411 | B2 | * | 10/2003 | Buscher et al. ............ 60/425 |
| 6,822,884 | B1 | * | 11/2004 | Rosenthal et al. ......... 363/59 |
| 6,878,317 | B2 | * | 4/2005 | Kubota ..................... 264/40.1 |
| 7,053,498 | B1 | * | 5/2006 | Boisvert et al. .......... 290/40 R |
| 7,320,216 | B2 | * | 1/2008 | VerKuilen et al. ......... 60/421 |
| 7,459,800 | B2 | * | 12/2008 | Boisvert et al. .......... 290/40 C |
| 7,562,615 | B2 | * | 7/2009 | Abe et al. .................. 91/436 |
| 8,322,322 | B2 | * | 12/2012 | Saito ........................ 123/196 A |

FOREIGN PATENT DOCUMENTS

| | | |
|---|---|---|
| JP | S63-171707 U | 11/1988 |
| JP | UH05-088701 | 12/1993 |
| JP | UH07-014226 | 3/1995 |
| JP | H11-117914 A | 4/1999 |
| JP | 2007-107409 A | 4/2007 |

OTHER PUBLICATIONS

Japan Patent Office, "Decision to Grant a Patent for JP 2009-219874", Jul. 2, 2013.

* cited by examiner

Related Art

FIG. 7

Related Art

HYDRAULIC SYSTEM AND WIND TURBINE GENERATOR PROVIDED THEREWITH

BACKGROUND OF THE INVENTION

1. Field of the Invention

The present invention relates to a hydraulic (actuation) system applied to wind turbine blade pitch control or the like and adapted to supply oil from a hydraulic tank into a hydraulic unit for blade pitch control (hydraulic actuation system such as a hydraulic cylinder) through a hydraulic main line by means of a hydraulic pump placed in the hydraulic main line in order to actuate the hydraulic unit with the oil, and a wind turbine generator provided therewith.

2. Description of the Related Art

Figure 6:
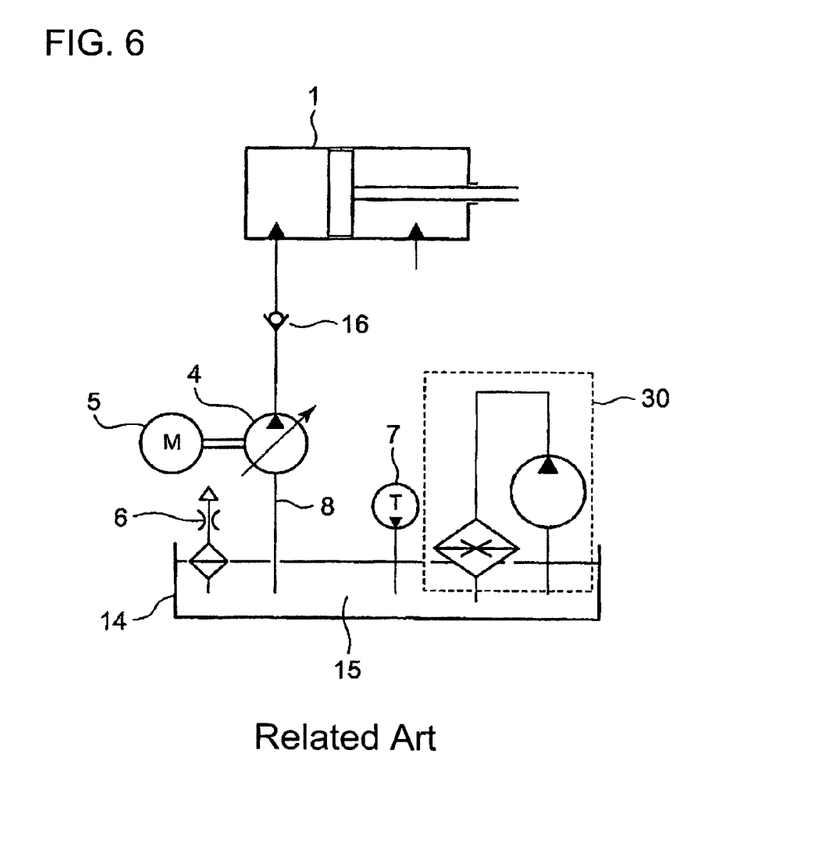
FIG. 6 is a diagram showing the outline of a hydraulic system for wind turbine blade pitch actuation.

FIG. 6 shows the outline of a hydraulic (actuation) system of a hydraulic unit for wind turbine blade pitch actuation, in which the hydraulic unit for blade pitch actuation designated by reference numeral 1 is supplied with oil 15 stored in a hydraulic tank 14 through a hydraulic main line 8.

A hydraulic pump 4 to be driven by a motor 5 is placed in the hydraulic main line 8, and the oil 15 in the hydraulic tank 14 is fed by the hydraulic pump 4 into the hydraulic unit 1 through the hydraulic main line 8. A check valve 16 capable of feeding oil only on the side of the hydraulic unit 1 is provided in the hydraulic main line 8.

In such a hydraulic system for blade pitch actuation, if the hydraulic pump of the hydraulic system is used in cold climates reaching about −30 degrees C., the oil temperature has to rise to −10 degrees C. or more to prevent damage to the equipment.

To this end, a heater 30 is placed to warm the oil 15 stored in the hydraulic tank 14. The temperature of the oil 15 in the hydraulic tank 14 is detected by a temperature sensor 7.

However, the method using such a conventional heater 30 takes three to four hours to rise the oil temperature from −30 degrees C. to −10 degrees C. at startup, for example, thus requiring a lot of time and the installation cost of the heater 30.

Patent Document 1 (Japanese Examined Utility Model Application Publication No. 61-23520) shows a hydraulic system adapted to open a logic valve (bypassed state) upon startup of a hydraulic pump in a hydraulic system for a steering gear and close the logic valve when the hydraulic pump reaches the steady rotation.

Figure 7:
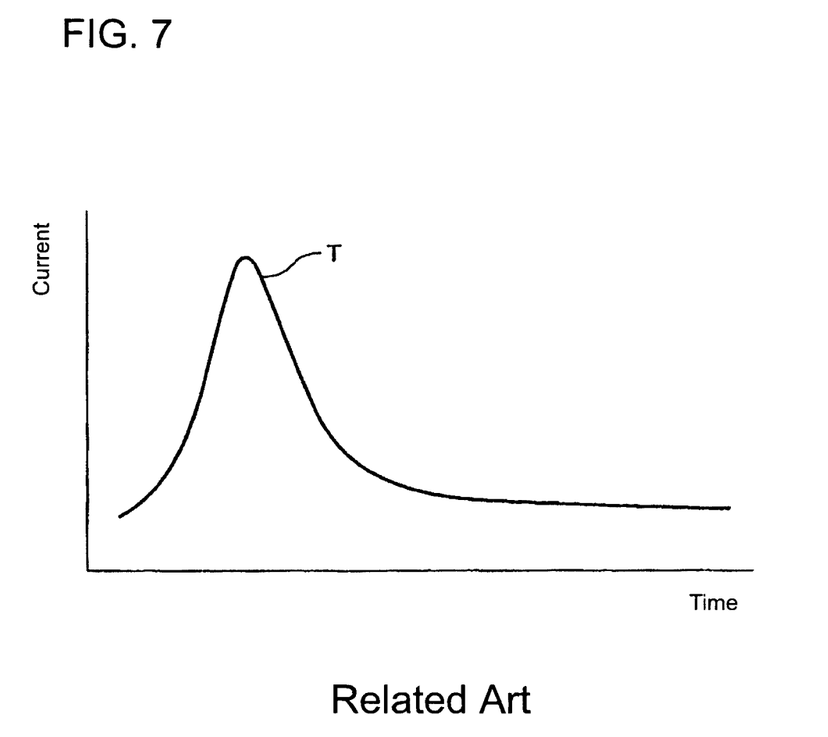
FIG. 7 is a graph of excess current flowing through the hydraulic system for wind turbine blade pitch actuation at startup.

Further, in the hydraulic system for wind turbine blade pitch actuation as shown in FIG. 6, if some load is left in the hydraulic system when the hydraulic system (hydraulic pump) is actuated at startup, excess current T flows through a motor 5 suddenly for a short time as shown in FIG. 7 to increase the load on the hydraulic system (hydraulic pump), resulting in an overload. If this overloaded state at startup is repeated, a problem can occur with wind turbine blade pitch or blade control.

SUMMARY OF THE INVENTION

In view of such a conventional technical problem, it is an object of the present invention to provide a hydraulic system (hydraulic actuation system such as a hydraulic cylinder), which avoids an overloaded state at startup to enable low-temperature, fast startup and maintaining of the temperature with low-cost means in order to improve low-temperature startability, and a wind turbine generator provided therewith.

The present invention has been made to attain such an object by comprising: a bypass path branching off from the discharge side of the hydraulic pump in the hydraulic main line into the hydraulic tank and flow rate control means provided in the bypass path to control the flow rate of the bypass path; a pressure sensor provided in an inlet of the hydraulic unit in the hydraulic main line; and a control device to which a pressure detection value is input from the pressure sensor to control the flow rate control means based on the pressure detection value, wherein oil is circulated in the bypass path while keeping the pump discharge pressure and the flow rate equal to or smaller than given specified values.

In the present invention, it is preferred that the flow rate control means be a bypass valve that opens or closes the bypass path.

In the present invention, it is also preferred that the flow rate control means be a variable flow valve that controls the oil flow rate of the bypass path.

In the above invention, it is preferred to further comprise a temperature sensor for detecting the temperature of the oil and inputting a temperature detection value to the control device, wherein when the temperature detection value is lower than a predetermined temperature, the control device circulates the oil in the bypass path while controlling the flow rate control means, and when the temperature detection value reaches the predetermined temperature, the control device performs control to stop oil circulation in the bypass path.

According to the present invention, the structure comprises: the bypass path branching off from the discharge side of the hydraulic pump in the hydraulic main line into the hydraulic tank and flow rate control means provided in the bypass path to control the flow rate of the bypass path; the pressure sensor provided in the inlet of the hydraulic unit in the hydraulic main line; and the control device to which the pressure detection value is input from the pressure sensor to control the flow rate control means based on the pressure detection value.

Then, oil is circulated in the bypass path while keeping the pump discharge pressure and the flow rate equal to or smaller than the given specified values.

Since no load in the hydraulic main line on the hydraulic pump discharge side is confirmed from the pressure of the pressure sensor before startup, an overload that conventionally occurs due to a flow of excess current in the hydraulic pump at startup can be avoided.

Further, the control device receives a pressure detection signal upon startup of the hydraulic system, performs so-called PWM control to turn on/off a pulse controlled bypass valve so that the pump power of the hydraulic unit will become the maximum in order to rise oil temperature in the hydraulic main line on the hydraulic pump discharge side, and further controls the pump discharge pressure and the flow rate to be equal to or smaller than preset specified values. This enables an operation at the maximum pump power value or smaller at all times, and hence oil temperature can rise efficiently.

Thus, PWM control to turn on/off the pulse controlled bypass valve is performed, and this enables low-temperature startup in a relatively short time. Therefore, high installation costs conventionally required for components such as the heater are not needed, resulting in a reduction in the device cost.

Further, the present invention comprises a variable flow valve in the bypass path, wherein the control device controls the bypass flow rate using the variable flow valve to rise the temperature, so that flow rate control can be performed by a flow restrictor of the variable flow valve at a set point with the maximum pump power value or smaller at all times while detecting pressure in the hydraulic main line by means of the pressure sensor, thereby enabling a stable operation at the maximum pump power at all times, oil temperature to rise efficiently, and low-temperature startup in a relatively short time. Therefore, high installation costs conventionally required for components such as the heater are not needed, resulting in a reduction in the device cost.

Further, in the above invention, the temperature sensor for detecting the temperature of the oil and inputting the temperature detection value to the control device, wherein when the temperature detection value is lower than a predetermined temperature, the control device circulates oil in the bypass path while controlling the flow rate control means, and when the temperature detection value reaches the predetermined temperature, the control device performs control to stop oil circulation in the bypass path. Thus, when the temperature of the hydraulic main line reaches the lowest actuation temperature of the equipment, the bypass path is closed to apply pressure to the hydraulic main line, enabling the normal operation.

Here, the hydraulic main line denotes a hydraulic line that guides hydraulic oil from the hydraulic tank to the hydraulic unit by means of the hydraulic pump.

The hydraulic system of the present invention is suitable for a wind turbine generator provided with a hydraulic system for wind turbine blade pitch actuation, especially for a wind turbine generator using a hydraulic pump of the hydraulic system in cold climates reaching about −30 degrees C.

DETAILED DESCRIPTION OF THE PREFERRED EMBODIMENTS

Preferred embodiments of the present invention will now be described in detail with reference to the drawings. Note that the size, material, shape, and relative position of components described in the embodiments do not limit the scope of this invention unless otherwise particularly mentioned, and the embodiments are just illustrative examples.

First Embodiment

Figure 1:
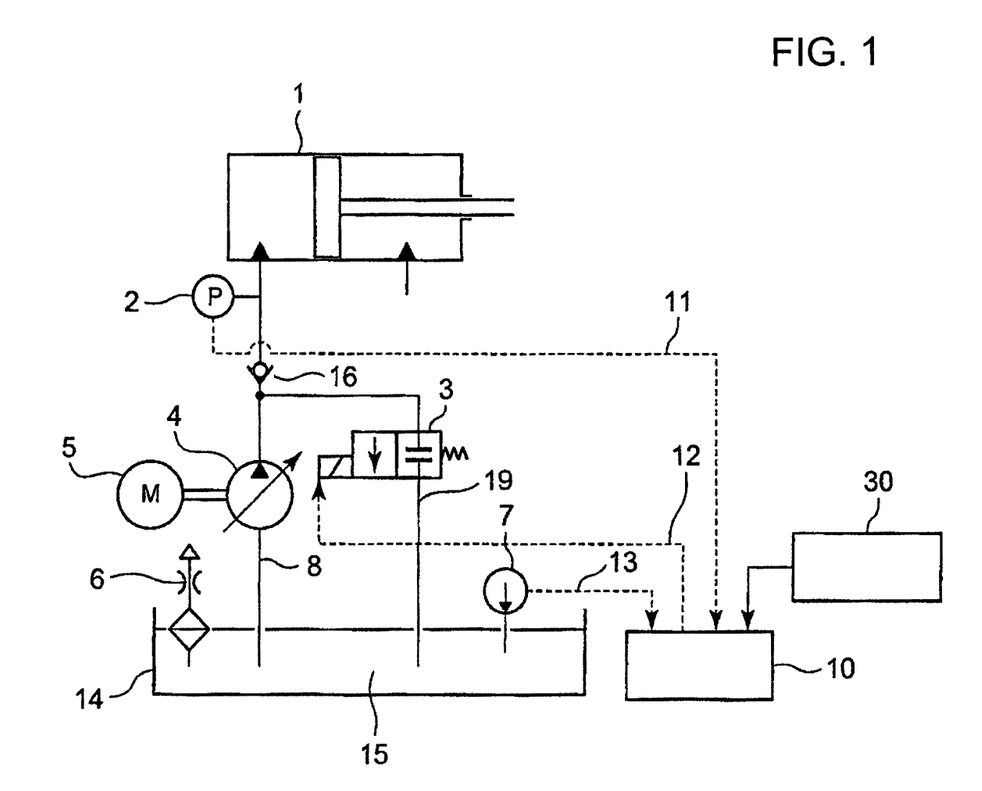
FIG. 1 is a system diagram of a starter of a hydraulic actuation system in a hydraulic system for wind turbine blade pitch actuation according to a first embodiment of the present invention.

FIG. 1 is a system diagram of a starter in a hydraulic system for wind turbine blade pitch actuation according to a first embodiment of the present invention.

In FIG. 1, a hydraulic unit for blade pitch actuation (hydraulic actuation system such as a hydraulic cylinder) designated by reference numeral 1 is supplied with oil 15 stored in a hydraulic tank 14 through a hydraulic main line 8.

A hydraulic pump 4 to be driven by a motor 5 is placed in the hydraulic main line 8, and the oil 15 in the hydraulic tank 14 is fed by the hydraulic pump 4 into the hydraulic unit 1 through the hydraulic main line 8. A check valve 16 capable of feeding oil only on the side of the hydraulic unit 1 is provided in the hydraulic main line 8 (where a proportional valve, not shown, is provided in the inlet of the check valve 16 to prevent oil from flowing into a cylinder of the hydraulic unit when a bypass valve 3 is turned off). Note that an air breather provided in the hydraulic tank 14 is designated by reference numeral 6.

A bypass path 19 branching off from the discharge side of the hydraulic pump 4 in the hydraulic main line 8 into the hydraulic tank 14 is placed. Further, the bypass valve 3 that opens or closes the bypass path 19 is inserted in the bypass path 19, and a pressure sensor 2 is provided in the inlet of the hydraulic unit 1 in the hydraulic main line 8.

The bypass valve 3 is turned on/off by a pulse control signal from a control device 10 to perform PWM control. The PWM control, i.e., on/off cycle control, can make it easy to control quantity/pressure of oil flowing through the bypass path 19, so that the maximum load operation of the hydraulic pump 4 can be controlled, and hence the heat of oil resulting from the action of the hydraulic pump 4 can be effectively used to rise oil temperature. In other words, the pressure of oil to be bypassed and the bypass flow rate can be effectively used to control the generation of heat by the action of the hydraulic pump 4 and further a rise of oil temperature caused by a pulsed pressure change in oil flow in the bypass path.

A pressure detection signal from the pressure sensor 2 is input to the control device 10 through a line 11. Further, a temperature sensor 7 for detecting the temperature of oil is provided in the hydraulic main line 8 or the hydraulic tank 14 (in this embodiment, it is provided in the hydraulic tank 14), and a temperature detection signal of the temperature sensor 7 is input to the control device 10 through a line 13.

A control value based on the pressure detection signal and the temperature detection signal is input to the control device 10 through a line 12 to control on/off of the bypass valve 3.

Figure 5:
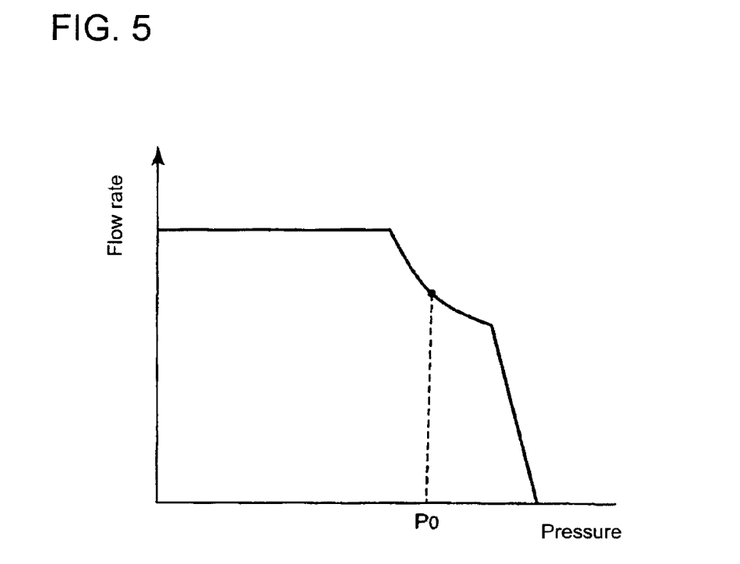
FIG. 5 is a graph showing a set curve of actuation power (flow rate/pressure) of a hydraulic unit.

As shown in FIG. 5, a set curve of actuation power of the hydraulic unit 1 is in a relationship (on a map) between pressure and flow rate. Such a relationship (map) is set in a maximum actuation power setting section 30, and Po set value in the maximum actuation power setting section 30 is input to the control device 10.

Note that the maximum actuation power is a power value at which "pressure×flow rate" becomes the maximum (where the pressure value at that time is expressed by Po).

Figure 3:
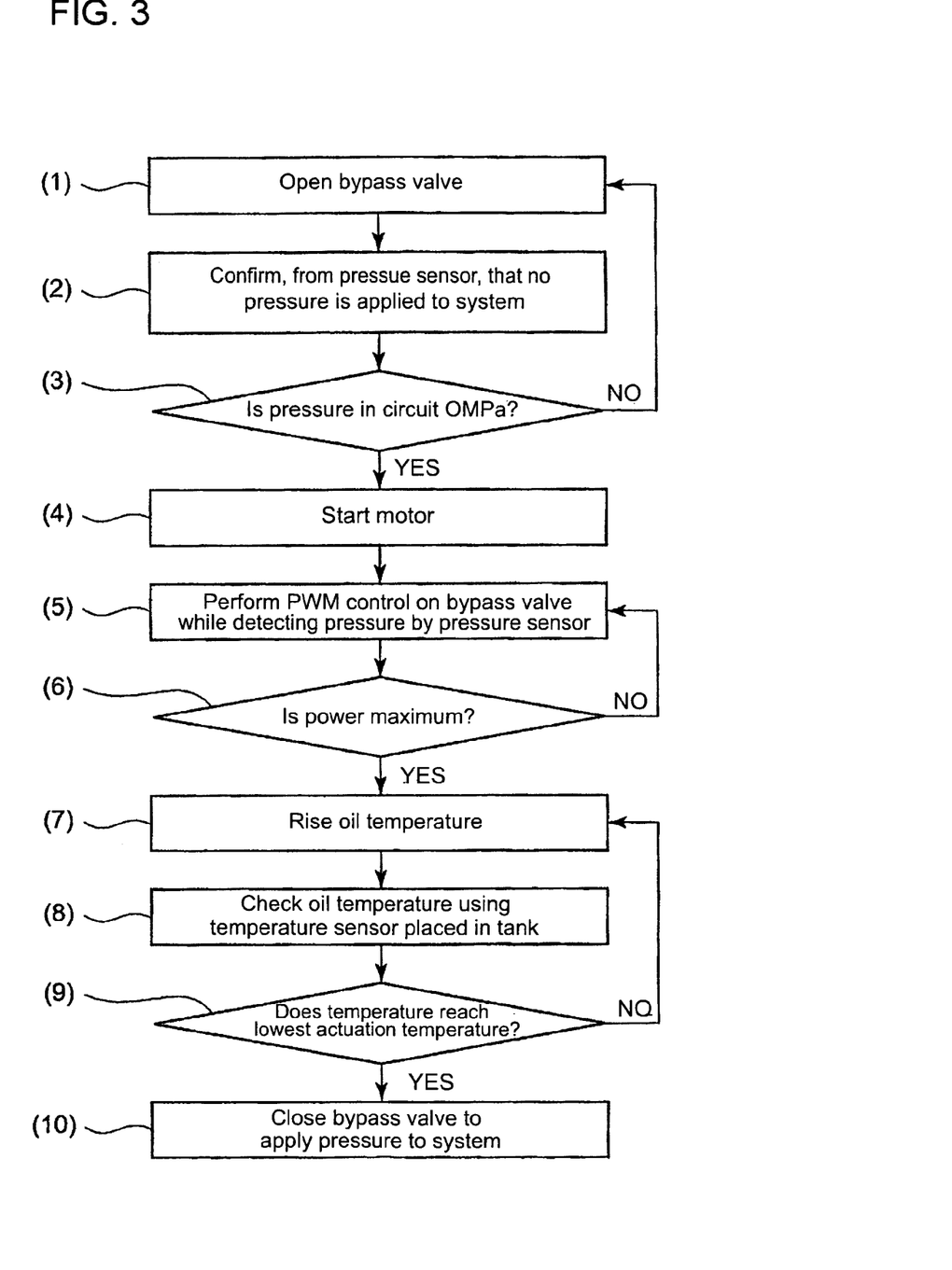
FIG. 3 is a flowchart showing the operation of the first embodiment of the present invention.

Next, the operation of the first embodiment will be described with reference to FIG. 1 and FIG. 3. FIG. 3 is a flowchart showing the operation of the first embodiment.

Upon startup of the hydraulic unit 1, the bypass valve 3 is first opened to open the bypass path 19 (step (1)), and from the pressure of the pressure sensor 2, it is confirmed that there is no load in the hydraulic main line 8 (on the discharge side of the hydraulic pump 4, especially between the check valve 16 and the inlet of the hydraulic unit 1 (step (2)). Next, from the pressure of the pressure sensor 2, it is determined whether the pressure in the hydraulic main line 8 reaches 0 Mpa (step (3)), and after that, the motor 5 is driven (step (4)).

This can drive the pump with no load between the hydraulic main line 8 on the discharge side of the hydraulic pump 4 and the inlet side of the unit 1 at startup. Therefore, an overload that conventionally occurs due to a flow of excess current (see FIG. 7) through the hydraulic pump 4 at startup can be avoided.

After startup of the hydraulic system, the pressure detection signal from the pressure sensor 2 is received while bypassing the oil to the bypass path 19 before the check valve 16 on the discharge side of the hydraulic pump 4 and circulating it between the pressure sensor 2 and the tank 14 to perform PWM control while turning on/off the bypass valve 3 according to the pulse control signal from the control device 10 so that the pressure value Po in the maximum actuation power ("pressure×flow rate") will become the maximum (step (5)). This rises the oil temperature of the main line 8 due to heat or the like generated by the pump 4 (steps (6) and (7)).

In this case, PWM control is performed while turning on/off the bypass valve 3, so that control is so performed that flow rate×pressure in FIG. 5 will become the maximum, i.e., the maximum value of pump power (preset specified pressure P0 and flow rate).

The temperature sensor 7 for detecting the temperature of oil is provided in the hydraulic main line 8 or the hydraulic tank 14 (in this embodiment, it is provided in the hydraulic tank 14), and the temperature detection signal of the temperature sensor 7 is input to the control device 10 through the line 13.

Then, the temperature from the temperature sensor 7, i.e., the temperature of the temperature sensor 7 provided in the hydraulic main line 8 or the hydraulic tank 14 (in this embodiment, it is provided in the hydraulic tank 14) is checked by the control device 10 (step (8)). If the temperature reaches the lowest actuation temperature (e.g., −10 degrees C.) of the hydraulic system (step (9)), the bypass valve 3 is closed to apply pressure (load) from the hydraulic main line 8 to the hydraulic unit 1 through the check valve 16.

Thus, according to this embodiment, the pressure detection signal from the pressure sensor 2 is received after startup of the hydraulic system to perform PWM control to turn on/off the pulse controlled bypass valve 3 so that the pump power (flow rate) of the hydraulic pump 4 will become the maximum. This enables the oil temperature of the hydraulic main line 8 to rise immediately. In other words, the bypass valve 3 is controlled to operate in pulses to perform PWM control while turning on/off the bypass valve 3, so that the bypass operation is performed under the control of the specified pressure P0 to maximize the pump power (Po). Heat received upon this pump actuation can rise oil temperature effectively.

Then, since this control achieves a bypass operation at the maximum value of actuation power (flow rate) during the bypass operation at startup by controlling the pressure or flow rate to locate the pump power (flow rate) of the hydraulic pump 4 at a point (specified pressure P0) on the preset maximum power generation line, oil temperature can rise efficiently.

Thus, PWM control is performed on the bypass valve 3 turned on/off by pulse control to achieve the bypass operation at the maximum value of actuation power (flow rate). For example, upon startup of the hydraulic system in cold climates reaching about −30 degrees C., an oil temperature of about −30 degrees C. has to rise to −10 degrees C. or higher. Such a temperature rise can reach −10 degrees C. or higher in a bypass operation of a relatively short time, and this enables low-temperature startup in a relatively short time. Therefore, high installation costs conventionally required for components such as the heater (see FIG. 6) are not needed, resulting in a reduction in the device cost.

Further, when the temperature of the hydraulic main line 8 reaches a predetermined actuation temperature (−10 degrees C. or higher) of the hydraulic unit 1, the bypass valve 3 is closed, while when it does not reach the predetermined actuation temperature, the bypass valve 3 is opened to repeat the bypass operation at the maximum value of actuation power (flow rate). When the temperature of the hydraulic main line 8 reaches the lowest actuation temperature of the equipment as a result of detection by the temperature sensor 7 set in the hydraulic main line 8, the bypass valve 3 is closed to apply pressure to the hydraulic main line 8, so that the normal operation can be performed.

Further, the embodiment can significantly reduce the warm-up time before running the hydraulic system for wind turbine blade pitch actuation. This may also be applied to a wind turbine hydraulic system other than the hydraulic system for wind turbine blade pitch actuation.

Further, such a hydraulic circuit like in this embodiment can make it easy to adjust the warm-up time compared to other components (bearing, etc.) of the wind turbine, enabling efficient warm-up.

Second Embodiment

Figure 2:
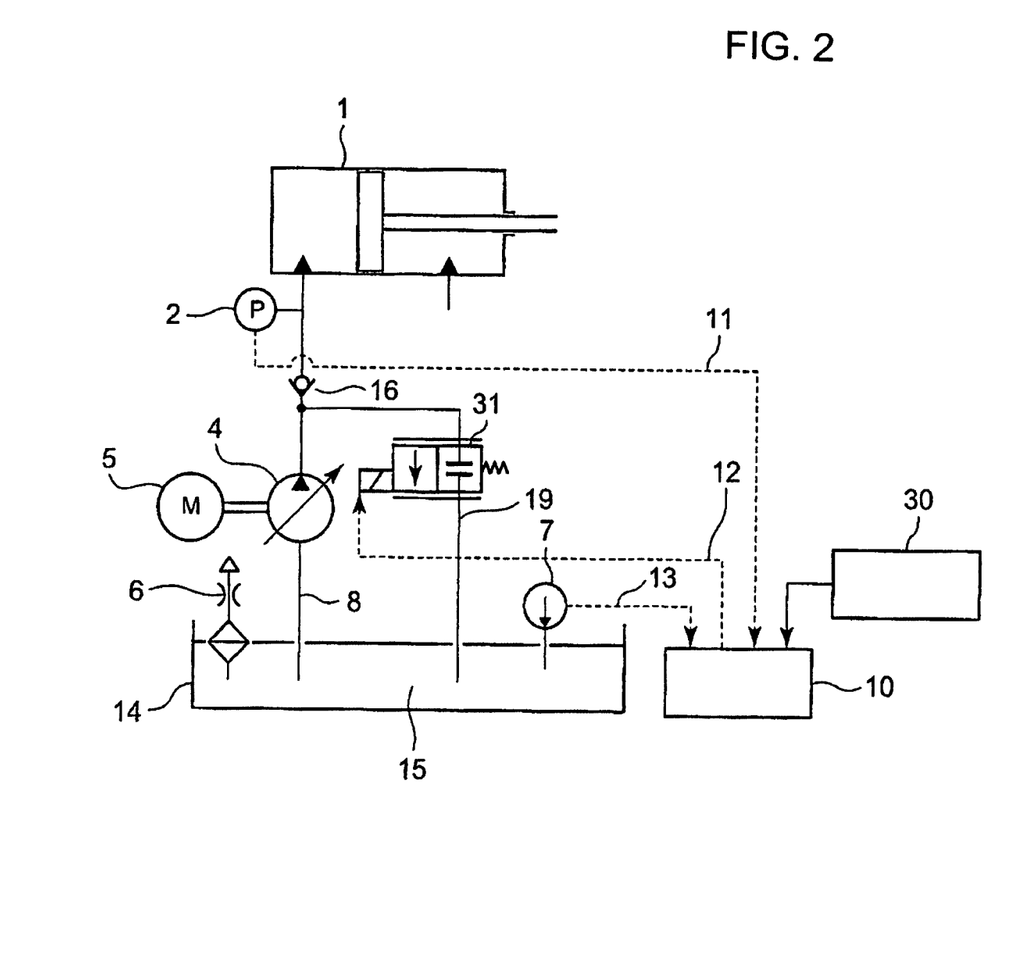
FIG. 2 is a system diagram of a starter of the hydraulic actuation system in the hydraulic system for wind turbine blade pitch actuation according to a second embodiment of the present invention.

FIG. 2 is a system diagram of a starter in a hydraulic system for wind turbine blade pitch actuation according to a second embodiment of the present invention.

This second embodiment differs from the first embodiment in that a variable flow valve 31 is provided in the bypass path 19 to make the flow restriction in the bypass path 19 variable.

Figure 4:
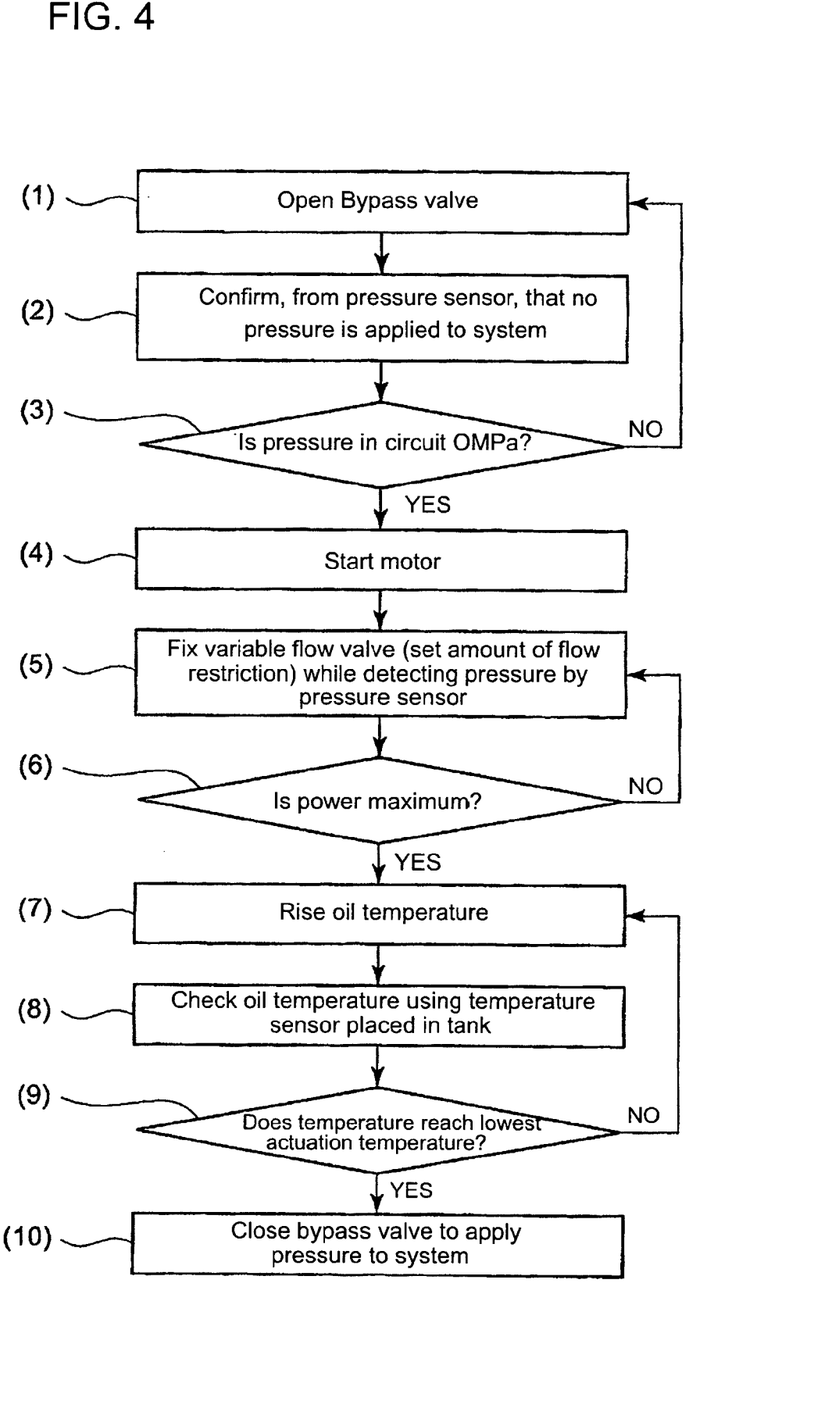
FIG. 4 is a flowchart showing the operation of the second embodiment of the present invention.

In other words, in a flowchart of FIG. 4 showing the operation of the second embodiment, step (5) is different from that in the first embodiment, and the other steps are the same.

In step (5), a pressure detection signal from the pressure sensor 2 is received after startup of the hydraulic system to change the amount of flow restriction (throttle) of the variable flow valve 31 in the hydraulic unit 1 in order to control flow path resistance of the bypass path 19.

Thus, since the flow rate is controlled by the throttle so that it will be located at a point (specified pressure P0) on the preset maximum power generation line while detecting pressure in the hydraulic main line 8 using the pressure sensor 2 in the hydraulic main line 8, the throttle of the variable flow valve 31 can be so controlled that the optimum flow rate is settable by the throttle at the set point with the maximum value of actuation power or smaller.

Since the other components are the same as those in the first embodiment, the same components are indicated by the same reference numerals.

According to the second embodiment, the bypass flow rate is controlled by the throttle to be located at the point (specified pressure PO) on the preset maximum power generation line while detecting pressure in the hydraulic main line 8 using the pressure sensor 2 in the hydraulic main line 8, so that an operation at the maximum power output point of the hydraulic pump, i.e., an operation at the maximum point of calorific power can be achieved. This can maintain a stable operation at the maximum value of actuation power.

According to the present invention, there can be provided a hydraulic pump startup control device in a hydraulic system, which avoids an overloaded state at startup to enable low-temperature, fast startup and maintaining of the temperature with low-cost means in order to improve low-temperature startability, and a wind turbine generator provided therewith. Even at times other than the startup of the hydraulic system, for example, during operation of wind turbine generator, in case that oil temperature detected by the temperature sensor 7 is likely to drop below the lowest actuation temperature of the equipment due to a drop in air temperature, the bypass operation may be performed as long as it does not interfere with blade pitch actuation to maintain the oil temperature at the lowest actuation temperature or higher.

The invention claimed is:

1. A hydraulic system adapted to feed oil from a hydraulic tank into a hydraulic unit, the hydraulic system comprising:
   a hydraulic main line for connecting the hydraulic tank and the hydraulic unit;
   a hydraulic pump placed in the hydraulic main line, the hydraulic pump feeding the oil from the hydraulic tank into the hydraulic unit through the hydraulic main line to actuate the hydraulic unit;
   a bypass path branching off from a discharge side of the hydraulic pump in the hydraulic main line to the hydraulic tank;
   a flow rate control means provided in the bypass path to control a flow rate of the bypass path;
   a pressure sensor provided in an inlet of the hydraulic unit in the hydraulic main line;
   a control device to which a pressure detection value is input from the pressure sensor to control the flow rate control means based on the pressure detection value; and
   a temperature sensor for detecting a temperature of the oil and inputting a temperature detection value to the control device,
   wherein the oil is circulated in the bypass path while keeping a pump discharge pressure and the flow rate equal to or smaller than given specified values, and
   wherein the control device is configured: to circulate the oil in the bypass path while controlling the flow rate control means in order to keep an actuation power of the hydraulic pump equal to a maximum value based on the pressure detection value and a set curve of an actuation power of the pressure and the flow rate of the hydraulic unit, when the temperature detection value is lower than a predetermined temperature; and to perform control to stop circulating the oil in the bypass path, when the temperature detection value reaches the predetermined temperature.

2. The hydraulic system according to claim 1, wherein the flow rate control means is a variable flow valve that controls the flow rate of the bypass path.

3. A wind turbine generator provided with the hydraulic system according to claim 1.

4. A hydraulic system adapted to feed oil from a hydraulic tank into a hydraulic unit, the hydraulic system comprising:
   a hydraulic main line for connecting the hydraulic tank and the hydraulic unit;
   a hydraulic pump placed in the hydraulic main line, the hydraulic pump feeding the oil from the hydraulic tank into the hydraulic unit through the hydraulic main line to actuate the hydraulic unit;
   a bypass path branching off from a discharge side of the hydraulic pump in the hydraulic main line to the hydraulic tank;
   a flow rate control means provided in the bypass path to control a flow rate of the bypass path;
   a pressure sensor provided in an inlet of the hydraulic unit in the hydraulic main line;
   a control device to which a pressure detection value is input from the pressure sensor to control the flow rate control means based on the pressure detection value; and
   a temperature sensor for detecting a temperature of the oil and inputting a temperature detection value to the control device,
   wherein the oil is circulated in the bypass path while keeping a pump discharge pressure and the flow rate equal to or smaller than given specified values,
   wherein the flow rate control means is a bypass valve that opens or closes the bypass path, and
   wherein the control device is configured: to perform control in order to set the pressure detection value at a pressure value where a maximum value of an actuation power of the hydraulic pump is obtained based on a set curve of an actuation power of the pressure and the flow rate of the hydraulic unit, when the temperature detection value is lower than a predetermined temperature; and to perform control to stop circulating the oil in the bypass path, when the temperature detection value reaches the predetermined temperature.

5. The hydraulic system according to claim 2, wherein the variable flow valve includes a flow restrictor, and the control device controls the flow restrictor in order to set the pressure detection value at a pressure value relative to the maximum value of the actuation power of the hydraulic pump.

6. The hydraulic system according to claim 1, further comprising a check valve arranged in the hydraulic main line between a portion branching off into the bypass path and the pressure sensor, and an air breather provided in the hydraulic tank.

7. The hydraulic system according to claim 6, wherein the temperature sensor is provided in the hydraulic tank and the flow rate control means is a variable flow valve to controls the flow rate of the bypass path, and the variable flow valve closes the bypass path, when the temperature detection value reaches the predetermined temperature such that the oil is fed from the hydraulic tank into the hydraulic unit through the check valve in the hydraulic main line.

8. A hydraulic system adapted to feed oil from a hydraulic tank into a hydraulic unit, the hydraulic system comprising:
   a hydraulic main line for connecting the hydraulic tank and the hydraulic unit;
   a hydraulic pump placed in the hydraulic main line, the hydraulic pump feeding the oil from the hydraulic tank into the hydraulic unit through the hydraulic main line to actuate the hydraulic unit;
   a bypass path branching off from a discharge side of the hydraulic pump in the hydraulic main line to the hydraulic tank;
   a flow rate control means provided in the bypass path to control a flow rate of the bypass path;
   a pressure sensor provided in an inlet of the hydraulic unit in the hydraulic main line;
   a control device to which a pressure detection value is input from the pressure sensor to control the flow rate control means based on the pressure detection value; and
   a temperature sensor for detecting a temperature of the oil and inputting a temperature detection value to the control device,
   wherein the oil is circulated in the bypass path while keeping a pump discharge pressure and the flow rate equal to or smaller than given specified values,
   wherein the flow rate control means is a bypass valve that is configured to open or close the bypass path, and
   wherein the control device is configured: to circulate the oil in the bypass path while controlling the bypass valve via PWM control in order to keep an actuator power of the hydraulic pump equal to or smaller than a maximum value based on the pressure detection value and a set curve of an actuation power of the pressure and the flow rate of the hydraulic unit, when the temperature detection value is lower than a predetermined temperature;

and to perform control to stop circulating the oil in the bypass path, when the temperature detection value reaches the predetermined temperature.

9. A hydraulic system adapted to feed oil from a hydraulic tank into a hydraulic unit, the hydraulic system comprising:
   a hydraulic main line for connecting the hydraulic tank and the hydraulic unit;
   a hydraulic pump placed in the hydraulic main line, the hydraulic pump feeding the oil from the hydraulic tank into the hydraulic unit through the hydraulic main line to actuate the hydraulic unit;
   a bypass path branching off from a discharge side of the hydraulic pump in the hydraulic main line to the hydraulic tank;
   a flow rate control means provided in the bypass path to control a flow rate of the bypass path;
   a pressure sensor provided in an inlet of the hydraulic unit in the hydraulic main line;
   a control device to which a pressure detection value is input from the pressure sensor to control the flow rate control means based on the pressure detection value; and
   a temperature sensor for detecting a temperature of the oil and inputting a temperature detection value to the control device,
   wherein the oil is circulated in the bypass path while keeping a pump discharge pressure and the flow rate equal to or smaller than given specified values, and
   wherein the control device is configured:
   to circulate the oil in the bypass path while controlling the flow rate control means in order to keep an actuation power of the hydraulic pump equal to a maximum value based on the pressure detection value and a set curve of an actuation power of the pressure and the flow rate of the hydraulic unit, when the temperature detection value is lower than a predetermined temperature;
   to perform control to stop circulating the oil in the bypass path, when the temperature detection value reaches the predetermined temperature, and
   to confirm that there is no load in the hydraulic main line based on the pressure detection value from the pressure sensor before a startup of the hydraulic pump.

10. A hydraulic system adapted to feed oil from a hydraulic tank into a hydraulic unit, the hydraulic system comprising:
    a hydraulic main line for connecting the hydraulic tank and the hydraulic unit;
    a hydraulic pump placed in the hydraulic main line, the hydraulic pump feeding the oil from the hydraulic tank into the hydraulic unit through the hydraulic main line to actuate the hydraulic unit;
    a bypass path branching off from a discharge side of the hydraulic pump in the hydraulic main line to the hydraulic tank;
    a flow rate control means provided in the bypass path to control a flow rate of the bypass path;
    a pressure sensor provided in an inlet of the hydraulic unit in the hydraulic main line;
    a control device to which a pressure detection value is input from the pressure sensor to control the flow rate control means based on the pressure detection value; and
    a temperature sensor for detecting a temperature of the oil and inputting a temperature detection value to the control device,
    wherein the oil is circulated in the bypass path while keeping a pump discharge pressure and the flow rate equal to or smaller than given specified values,
    wherein the flow rate control means is a bypass valve that opens or closes the bypass path, and
    wherein the control device is configured:
    to perform control in order to set the pressure detection value at a pressure value where a maximum value of an actuation power of the hydraulic pump is obtained based on a set curve of an actuation power of the pressure and the flow rate of the hydraulic unit, when the temperature detection value is lower than a predetermined temperature;
    to perform control to stop circulating the oil in the bypass path, when the temperature detection value reaches the predetermined temperature, and
    to confirm that there is no load in the hydraulic main line based on the pressure detection value from the pressure sensor before a startup of the hydraulic pump.

11. A hydraulic system adapted to feed oil from a hydraulic tank into a hydraulic unit, the hydraulic system comprising:
    a hydraulic main line for connecting the hydraulic tank and the hydraulic unit;
    a hydraulic pump placed in the hydraulic main line, the hydraulic pump feeding the oil from the hydraulic tank into the hydraulic unit through the hydraulic main line to actuate the hydraulic unit;
    a bypass path branching off from a discharge side of the hydraulic pump in the hydraulic main line to the hydraulic tank;
    a flow rate control means provided in the bypass path to control a flow rate of the bypass path;
    a pressure sensor provided in an inlet of the hydraulic unit in the hydraulic main line;
    a control device to which a pressure detection value is input from the pressure sensor to control the flow rate control means based on the pressure detection value; and
    a temperature sensor for detecting a temperature of the oil and inputting a temperature detection value to the control device,
    wherein the oil is circulated in the bypass path while keeping a pump discharge pressure and the flow rate equal to or smaller than given specified values,
    wherein the flow rate control means is a bypass valve that is configured to open or close the bypass path, and
    wherein the control device is configured:
    to circulate the oil in the bypass path while controlling the bypass valve via PWM control in order to keep an actuator power of the hydraulic pump equal to or smaller than a maximum value based on the pressure detection value and a set curve of an actuation power of the pressure and the flow rate of the hydraulic unit, when the temperature detection value is lower than a predetermined temperature;
    to perform control to stop circulating the oil in the bypass path, when the temperature detection value reaches the predetermined temperature, and
    to confirm that there is no load in the hydraulic main line based on the pressure detection value from the pressure sensor before a startup of the hydraulic pump.

* * * * *